US011888222B1

(12) United States Patent
Aston et al.

(10) Patent No.: US 11,888,222 B1
(45) Date of Patent: Jan. 30, 2024

(54) FLANGE FOR 3D PRINTED ANTENNAS AND RELATED METHODS

(71) Applicant: The Boeing Company, Chicago, IL (US)

(72) Inventors: Richard Aston, Steilacoom, WA (US); Nicole D. Schoenborn, Tacoma, WA (US); Rachel L Roth, Los Angeles, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/951,583

(22) Filed: Sep. 23, 2022

(51) Int. Cl.
*H01Q 13/02* (2006.01)

(52) U.S. Cl.
CPC ..... *H01Q 13/0266* (2013.01); *H01Q 13/0233* (2013.01)

(58) Field of Classification Search
CPC . H01Q 13/02; H01Q 13/0233; H01Q 13/0266
See application file for complete search history.

(56) References Cited

U.S. PATENT DOCUMENTS

| | | | | |
|---|---|---|---|---|
| 7,027,003 | B2 * | 4/2006 | Sasaki | H01Q 13/02 343/786 |
| 11,015,872 | B2 | 5/2021 | Aston et al. | |
| 11,103,925 | B2 | 8/2021 | Aston et al. | |
| 11,105,459 | B2 | 8/2021 | Aston et al. | |
| 11,274,722 | B2 | 3/2022 | Aston et al. | |
| 11,283,143 | B2 | 3/2022 | Aston et al. | |
| 2004/0222934 | A1 * | 11/2004 | Wu | H01Q 13/0266 343/786 |
| 2019/0291186 | A1 | 9/2019 | Aston et al. | |
| 2020/0096081 | A1 | 3/2020 | Aston et al. | |
| 2020/0331640 | A1 | 10/2020 | Mindock et al. | |
| 2020/0373657 | A1 | 11/2020 | Aston et al. | |
| 2021/0061495 | A1 | 3/2021 | Aston et al. | |
| 2021/0247140 | A1 | 8/2021 | Aston et al. | |
| 2021/0341098 | A1 | 11/2021 | Aston et al. | |

(Continued)

FOREIGN PATENT DOCUMENTS

| | | | | |
|---|---|---|---|---|
| CN | 107425294 A * | 12/2017 | | H01Q 1/50 |
| EP | 3979419 A1 | 4/2022 | | |

*Primary Examiner* — Daniel Munoz
(74) *Attorney, Agent, or Firm* — Kolitch Romano Dascenzo Gates LLC

(57) ABSTRACT

Antenna components include an additively manufactured elongate body portion and one or more additively manufactured flanges. The elongate body portion extends from a base portion to an aperture opposite the base portion. The elongate body portion is at least substantially hollow and is configured to direct radio frequency signals. Each flange extends radially outwardly from the elongate body portion and around an outer circumference of the elongate body portion. Each flange is integrally formed with the elongate body portion, and includes an angled portion and a horizontal portion. The angled portion of the flange diverges from the elongate body portion at an acute angle, and the horizontal portion is at least substantially perpendicular to a longitudinal axis of the elongate body portion. Satellite systems including said antenna components also are disclosed, along with related methods of additively manufacturing antenna components with integral flanges.

20 Claims, 6 Drawing Sheets

(56) References Cited

U.S. PATENT DOCUMENTS

| | | | |
|---|---|---|---|
| 2021/0354856 | A1 | 11/2021 | Aston et al. |
| 2021/0354859 | A1 | 11/2021 | Aston et al. |
| 2021/0356015 | A1 | 11/2021 | Aston et al. |
| 2021/0362230 | A1 | 11/2021 | Aston et al. |
| 2022/0140487 | A1 | 5/2022 | Aston et al. |
| 2022/0194632 | A1 | 6/2022 | Aston et al. |
| 2022/0194635 | A1 | 6/2022 | Aston et al. |

* cited by examiner

FLANGE FOR 3D PRINTED ANTENNAS AND RELATED METHODS

FIELD

The present disclosure relates generally to additive manufacturing, and more particularly to flanges for 3D printed antennas.

BACKGROUND

Antennas serve to transmit and/or receive radio signals in radio communications devices, and are sometimes used as passive microwave communication devices for spacecraft and other flight vehicles. The conductive materials used in antennas function as an interface between electric currents in a radio communications circuit and electromagnetic waves that are radiated to or from the antenna. Antenna properties, such as impedance, directionality, and bandwidth may be controlled by the geometry and material used to form the antenna, with desired properties varying depending on the intended location and/or application of a given antenna. For example, consumer radios may use a monopole omnidirectional antenna capable of receiving signals from any direction, whereas GPS satellites may use a directional waveguide antenna designed to transmit towards Earth. For many applications, effective antennas require complex geometry manufactured with high precision. Such antennas are conventionally manufactured by manual assembly of multiple individually machined or spun formed parts, which can be a time-consuming and expensive process.

Additive manufacturing (often referred to as "3D printing") is being used in many industries as a method of rapid production of parts at relatively low cost. Additive manufacturing creates objects from a three dimensional model by building the object incrementally, layer by layer. Each time a new layer of raw material (typically granules or powder) is deposited, it is then selectively joined or fused by a heat source to build (i.e., "print") the desired object. Common raw materials may include thermoplastic polymer, metal powder, metal alloy powder, or ceramic powder, while heat sources are often computer-controlled laser or electron beams. Examples of additive manufacturing techniques include selective laser melting, direct metal laser sintering, selective laser sintering, fused deposition modeling, and electron beam melting.

However, conventional part designs used in machining, spin-forming, or other subtractive manufacturing processes may be inefficient or unfeasible for additive manufacturing techniques. For example, additive manufacturing certain designs may result in collapse of unsupported features or elements of the design, features may be produced with insufficient resolution, and/or warping and cracking may occur. In the case of antennas, additive manufacturing would theoretically allow for production of lighter antennas in less time and for less cost, though previous attempts at additively manufacturing functional antennas have proven challenging. For example, material shrinkage at transitions can result in local antenna geometric distortion such as circumferential recesses. This is especially prevalent in the case of designs including flanges, which are often included on external surfaces of antenna horns for mounting (e.g., mounting a thermal blanket to the antenna horn, and/or mounting the antenna horn to other components).

Attempting to produce these flanges via additive manufacturing has required the use of support structures and/or results in shrinkage and deformities on the inner surface of the antenna horn circumferentially around the inner surface corresponding to the location of the flange(s). Additive manufacturing creates its own set of geometric constraints, and antenna geometry must be highly precise for electrical performance. Thus, these deformities often result in non-functional antennas, antennas with sub-optimal performance or functionality, and/or issues with repeatability. Furthermore, the use of secondary support structures is undesirable because it introduces additional post-processing tasks, thereby increasing time and costs for producing the part, as well as introducing another potential for inconsistent geometries or supplier differences.

SUMMARY

Presently disclosed antenna components (e.g., antenna horns) and methods of additively manufacturing said antenna components may address the shortcomings of prior art attempts to additively manufacture such antenna components. Specifically, presently disclosed antenna components include novel flange geometry that supports the antennas' performance requirements, which may enable the antenna component (and/or the entire antenna) to be 3D printed, thereby creating savings in cost, mass, and/or schedule/cycle time. Said novel flange geometry may increase dimensional stability by decreasing or at least substantially preventing deformation of the interior surface of the antenna component. Additionally, disclosed flange geometry for antenna components may reduce the melt pool area at the flange cross-section and/or may be printable without requiring the use of secondary supports.

One example of an antenna component, such as an antenna horn, includes an additively manufactured elongate body portion and at least one additively manufactured flange. The elongate body portion extends from a base portion to an aperture opposite the base portion. The elongate body portion is at least substantially hollow and is configured to direct radio frequency signals. The flange extends radially outwardly from the elongate body portion and around an outer circumference of the elongate body portion. The flange is integrally formed with the elongate body portion, and includes an angled portion that diverges from the elongate body portion at an acute angle, and a horizontal portion that is at least substantially perpendicular to a longitudinal axis of the elongate body portion.

Satellite systems are also disclosed and may include a body having an external wall structure at least partially forming an enclosed compartment, and may further include an antenna component as described above. In disclosed satellite systems, the antenna component may be coupled to the body, and is configured to receive and transmit data while in space. Said satellite systems also may include a multi-layer insulation thermal blanket coupled to a flange of the antenna component, such as the flange closest to the aperture in examples having more than one flange.

Related methods of additively manufacturing antenna components are also disclosed. Said methods may include additively manufacturing an elongate body portion, and additively manufacturing a first flange that extends radially outwardly from the elongate body portion and annularly around an outer circumference of the elongate body portion, wherein the first flange is integrally formed with the elongate body portion. Specifically, additively manufacturing the first flange may include additively manufacturing an angled portion of the first flange, wherein the angled portion diverges from the elongate body portion at an acute angle, and additively manufacturing a horizontal portion of the first flange, wherein the horizontal portion is at least substantially perpendicular to a longitudinal axis of the elongate body portion.

DESCRIPTION

Figure 1:
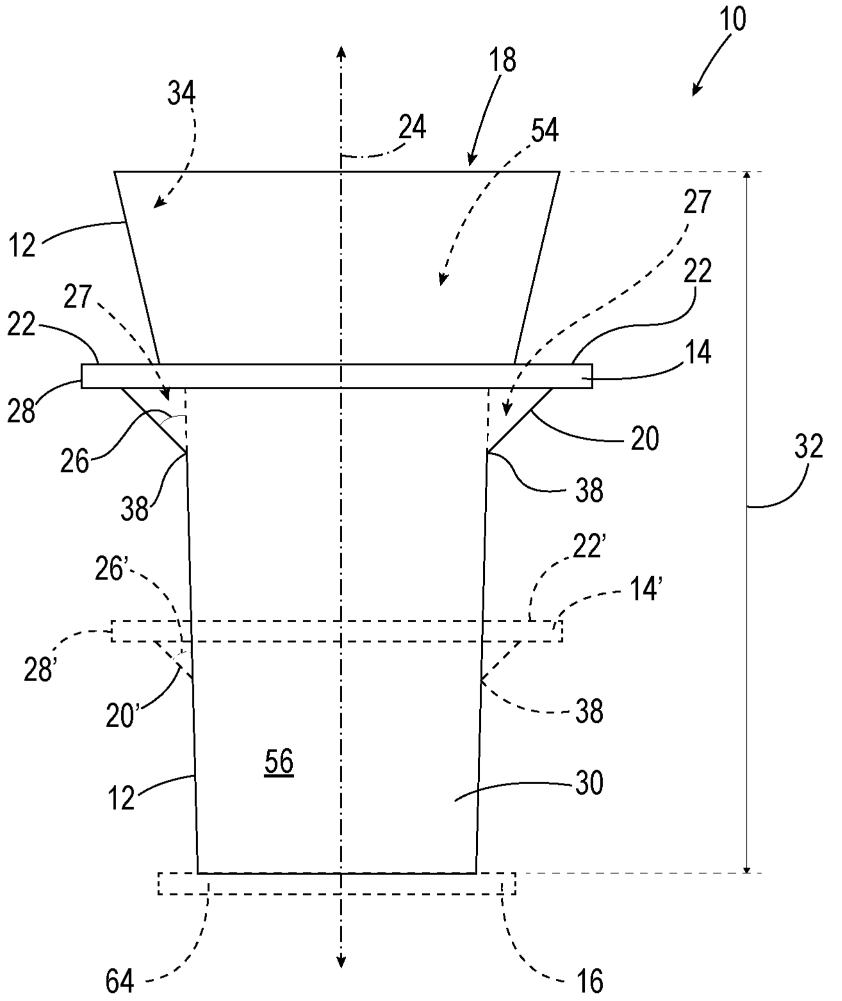
FIG. 1 is a schematic, side elevation view of non-exclusive, illustrative examples of antenna components according to the present disclosure.
Figure 2:
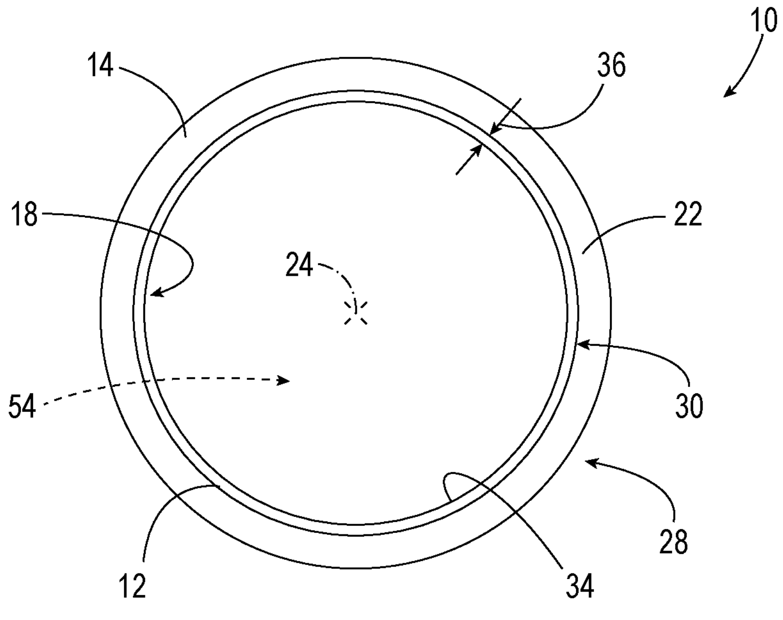
FIG. 2 is a schematic, top plan view of non-exclusive, illustrative examples of antenna components according to the present disclosure.
Figure 3:
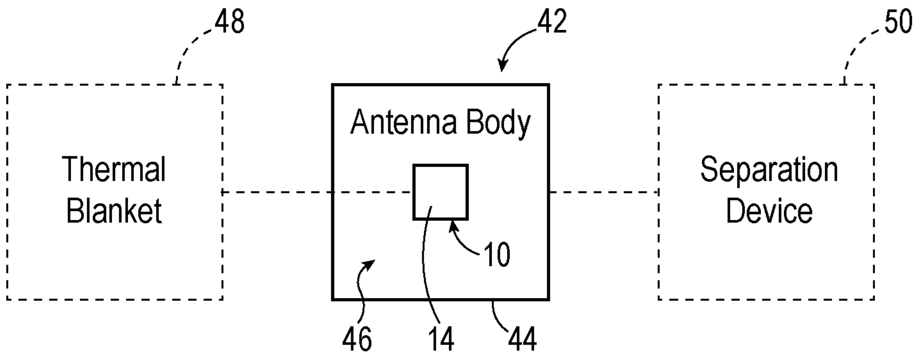
FIG. 3 is a schematic, black box diagram representing examples of satellite systems incorporating presently disclosed antenna components.

FIGS. 1-3 schematically illustrate illustrative, non-exclusive examples of antenna components 10 and/or satellite systems 40 according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure.

In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

With primary reference to FIGS. 1-2, disclosed antenna components 10 are configured to be additively manufactured. Preferably, disclosed antenna components 10 may be additively manufactured in one process (i.e., as a single, unitary, monolithic, integrally formed structure), without need for assembly of separate parts, though in some examples, one or more separate parts may be coupled to the primary structure of antenna component 10. Disclosed antenna components 10 also may be additively manufactured without the use of secondary supports that would require removal and/or post-processing after manufacture. Avoiding the use of secondary support structures also may increase radio frequency (RF) repeatability in resulting antenna components 10, and may result in more consistent geometry for overall assembly of satellites and antennas, especially when assembling parts from multiple different suppliers. Additionally, when secondary supports are used in additive manufacturing, their removal often requires hand finishing, so disclosed antenna components 10 that enable avoiding the use of secondary supports also have the added benefit of avoiding these hand finishing processes after manufacture. FIG. 1 schematically represents illustrative examples of antenna components 10, shown from a side elevation view, while FIG. 2 schematically represents illustrative examples of antenna components 10 shown from a top plan view. Antenna components 10 may be configured to facilitate sending and/or receiving radio signals, and may function as part of a conventional antenna such as a command horn, cup dipole, or waveguide antenna. Antenna components 10 may additionally or alternatively function as an antenna without additional components. In some examples, antenna component 10 is configured to be incorporated into or utilized with a satellite system 40, as schematically represented in FIG. 3.

Figure 9:
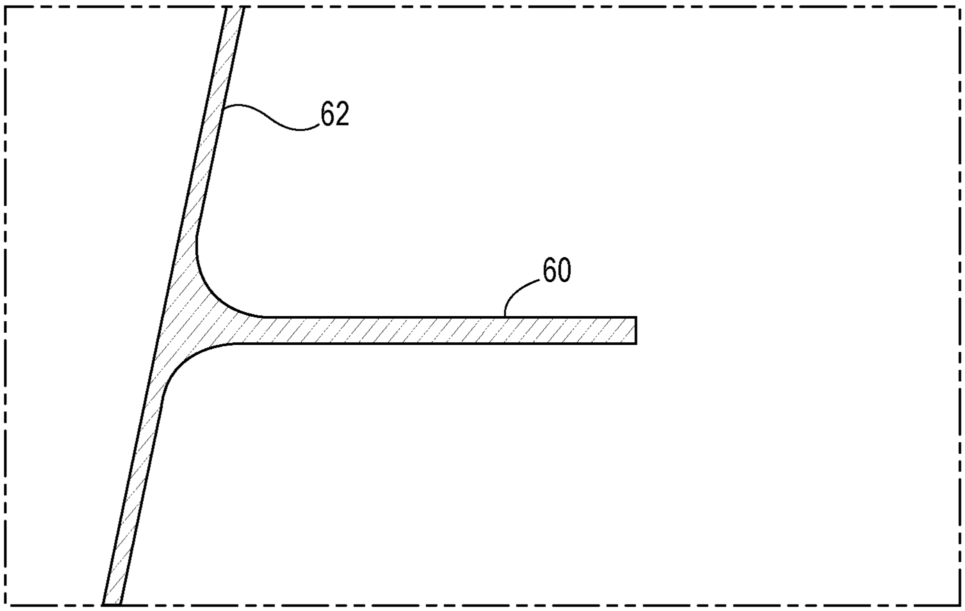
FIG. 9 PRIOR ART
FIG. 9 is a close-up side elevation view of a portion of a prior art flange on a prior art antenna component.

Disclosed antenna components 10 include an additively manufactured elongate body portion 12 and at least one additively manufactured flange 14. Elongate body portion 12 extends from a base portion 16 to an aperture 18, with elongate body portion 12 being at least substantially hollow. Flange 14 extends radially outwardly from elongate body portion 12, and is integrally formed with elongate body portion 12. Flange 14 includes an angled portion 20 that diverges from elongate body portion 12 at a first angle 26, and a horizontal portion 22 that is at least substantially perpendicular to a longitudinal axis 24 of elongate body portion 12. Horizontal portion 22 of flange 14 is continuous with angled portion 20. Horizontal portion 22 of each flange 14 may be positioned closer to aperture 18 than an origination point 38 of angled portion 20 of each flange 14. In other words, angled portion 20 of each flange 14 typically opens up towards aperture 18. This geometry of flange 14 effectively creates a recess 27 between angled portion 20 and an outer surface 56 of elongate body portion 12, with horizontal portion 22 of flange 14 being spaced apart from outer surface 56 by recess 27. In other words, while angled portion 20 of flange 14 is directly connected to (e.g., contacts outer surface 56 of elongate body portion 12 at origination point 38), horizontal portion 22 of flange 14 does not directly contact outer surface 56 of elongate body portion. This is in direct contrast to conventional flange design in prior art components, as shown in FIG. 9, which shows a prior art flat flange 60 that is directly coupled to an outer surface 62 of a prior art part, and extends outward, substantially perpendicularly to outer surface 62. The arrangement of the prior art flat flange 60 shown in FIG. 9 results in deformities and shrinkage when this design is attempted to be additively manufactured, as discussed in the Background section of the present application. Because one or more flanges may be essential for performance of antenna component 10 (and/or for the antenna or satellite into which antenna component 10 is integrated), the conventional design shown in FIG. 9 was unable to be successfully additively manufactured because the deformities interfered with the functionality of the resulting parts. On the other hand, the presently disclosed design of flanges 14 enables disclosed antenna components 10 to be additively manufactured and have the needed and desired properties for radio frequency (RF) communications.

Specifically, additively manufacturing antenna components 10 with one or more flanges 14 having respective angled portions 20 may result in increased dimensional stability, may reduce the melt pool area at the flange cross-section, enable printing without secondary supports, and/or may decrease or at least substantially eliminate deformation of an interior surface 34 due to shrinkage or other effects seen in attempts to additively manufacture conventionally-shaped flanges without disclosed angled portion 20. Disclosed flanges 14 and methods of additively manufacturing the same may enable performance requirements to be met for additively manufactured antenna components 10. Parts used in antennas and satellites (e.g., antenna components 10) need to be made with fine geometric control to enable proper functionality, and attempting to manufacture parts with additive manufacturing introduces its own geometric constraints, which was not possible with the prior art flat flanges 60 shown in FIG. 9, but is enabled with presently disclosed antenna components 10.

With continued reference to FIGS. 1-2, elongate body portion 12 may have any suitable cross-sectional shape. Put another way, elongate body portion 12 may be said to have a body perimeter 30 of one or more different shapes. For example, as shown in FIG. 2, elongate body portion 12 may have a circular cross-sectional shape (e.g., elongate body portion 12, or portions thereof, may have a tubular, cylindrical, and/or conical shape, or body perimeter 30). Additionally or alternatively, elongate body portion 12, or portions thereof, may have a square or rectangular cross-sectional shape or body perimeter 30, such as in the case of pyramidal shapes. Some antenna components 10 may have an elongate body portion 12 that includes one or more conical sections and/or one or more cylindrical sections. Some antenna components 10 may have an elongate body portion 12 with one or more portions having different diameters or maximum widths than one or more other portions (e.g., body perimeter 30 may have varying widths at different points along a length, or height, 32 of elongate body portion 12), and/or elongate body portion 12 may include one or more portions, or sections, where the diameter or maximum width varies along the length of the section. In various examples of antenna components 10, elongate body portion 12 may have any shape that may be configured to direct radio frequency signals. In other words, elongate body portion 12 may be configured to form a channel for sending and/or receiving radio frequency signals, may be configured to direct radio frequency signals, and/or may be configured to direct electromagnetic radiation within an operating frequency range. For example, antenna components 10 configured for use as or with a satellite antenna may be configured to operate on radio frequencies between approximately 8 and 18 Gigahertz, in some examples. Elongate body portion 12 may be configured to direct radio frequency signals within the X-band, Ka-band, Ku band, C band, UHF band, S band, and/or L band.

Interior surface 34 of elongate body portion 12 may have any geometry configured to facilitate transmission and/or reception of radio frequency electromagnetic waves. In some examples, interior surface 34 is configured for a selected polarization, resonant frequency band, radiation pattern, and/or any functional antenna properties. Additionally, elongate body portion 12 may have a wall thickness 36 configured for a selected polarization, resonant frequency band, radiation pattern, and/or any functional antenna properties. For example, wall thickness 36 of elongate body portion 12 may be at least 0.15 millimeters (mm), at least 0.20 mm, at least 0.25 mm, at least 0.30 mm, at least 0.35 mm, at least 0.40 mm, at least 0.50 mm, and/or at most 1 mm. When disclosed antenna components 10 are incorporated into antennas or satellites used in aerospace applications, aperture 18 generally will be open towards, or facing, outer space, such that wall thickness 36 at aperture 18 may be critical to performance of antenna component 10.

One or more flanges 14 of disclosed antenna components 10 may be annular (e.g., may have a flange perimeter 28 that is at least substantially circular) in some examples, though flanges 14 are not limited to the same. Thus, flange perimeters 28 may be square, rectangular, elliptical, oval, and/or other shapes in various examples of antenna components 10. In some examples, one or more flanges 14 may blend from a circular form to a square, rectangular, or other shaped form (or vice versa), depending on the shape of antenna component 10 and the interfacing requirements of the same. In some examples, flange 14 may have a flange perimeter 28 of the same shape as the body perimeter 30 of elongate body portion 12 in the area of flange 14 (with said body perimeter 30 corresponding to the cross-sectional shape of elongate body portion 12). For example, flange 14 may have a square flange perimeter 28 when elongate body portion 12 has a square cross-sectional shape. Regardless of the cross-sectional shape of elongate body portion 12, flange 14 is generally positioned such that it is integrally formed with and surrounding body perimeter 30 (which may be referred to as an outer circumference 30 when the cross-sectional shape is circular) and which forms outer surface 56 of elongate body portion 12.

As noted above, angled portion 20 of flange 14 diverges away from elongate body portion 12 at an angle 26. Said angle 26 typically is acute. In some examples, angle 26 at which angled portion 20 diverges from elongate body portion 12 may be at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, and/or at least 60 degrees. In some examples, angle 26 may be between about 30 and 45 degrees. In some examples, angle 26 may be at most 60 degrees. Angle 26 may be selected such that antenna component 10 is configured to be additively manufactured as a single unitary body without use of a support structure. Flanges 14, and angles 26 at which angled portions 20 diverge from elongate body portion 12, are generally configured to at least substantially prevent deformation of interior surface 34 of elongate body portion 12 during additive manufacturing of antenna component 10. That said, in examples of antenna components 10 including two or more flanges 14, the respective angle 26 of each respective flange 14 may be different for each respective flange 14, or one or more flanges 14 in a given antenna component 10 may have substantially the same angle 26 as one or more other flanges 14 in the antenna component 10.

Base portion 16 may be an additively manufactured base portion 16. In some examples, base portion 16 is integrally formed with elongate body portion 12 such that antenna component 10 is a singular additively manufactured monolithic structure, though in other examples, base portion 16 may be formed separately (via additive manufacturing, or otherwise) and then coupled to elongate body portion 12. Specifically, base portion 16 may be machined, molded, cast, or additively manufactured separately, and then coupled to elongate body portion 12. Base portion 16 may include one or more apertures 64 or other attachment points for securing base portion 16 (and thereby, antenna component 10) to other parts or components, such as within satellite systems 40 (FIG. 3). Base portion 16 may be a circular base portion 16 that extends radially outward from elongate body portion 12, or base portion 16 may have an alternative shape, such as a square or polygonal footprint. Base portion 16 may be configured to support and stabilize elongate body portion 12, in some examples.

Antenna components 10 may include any number of flanges 14. For example, antenna components 10 may include a second flange 14' (FIG. 1) extending radially outward from elongate body portion 12 such that second flange 14' also surrounds outer circumference 30 of elongate body portion 12. Second flange 14' may be annular (though second flange 14' is an example of flange 14 and thus may have any of the features and variations discussed herein), and is integrally formed with elongate body portion 12. As with first flange 14, second flange 14' includes a second angled portion 20' that diverges from elongate body portion 12 at a second angle 26', and a second horizontal portion 22' that is at least substantially perpendicular to longitudinal axis 24. A second flange perimeter 28' of second flange 14' may be the same or different shape as first flange perimeter 28 of first flange 14. Additionally or alternatively, second flange perimeter 28' may have the same diameter or maximum width as first flange perimeter 28, or second flange perimeter 28' may be larger or smaller than first flange perimeter 28 in diameter or maximum width.

Second angle 26' is acute, and may be the same as, or different from one or more other angles 26 of one or more other flanges 14 of antenna component 10. In some examples, first angle 26 and/or second angle 26' (and/or any additional angles 26 formed by additional flanges 14) may be 30 degrees or more. Additionally or alternatively, first angle 26 and/or second angle 26' (and/or any additional angles 26 formed by additional flanges 14) may be 60 degrees or less. First angle 26 and/or second angle 26' (and/or any additional angles 26 formed by additional flanges 14) may be selected such that antenna component 10 is configured to be additively manufactured as a single unitary body without use of a support structure.

Height, or length, 32 of antenna component 10, as used herein, is defined as the distance between aperture 18 and base portion 16 (or other end of elongate body portion 12 opposite aperture 18). One or more flanges 14 (e.g., first flange 14, second flange 14', or one or more additional flanges 14) may be positioned anywhere along height 32 of elongate body portion 12. In some examples, one or more flanges 14 may be an upper flange 14 positioned within an upper 50% of elongate body portion 12, relative to base portion 16. Additionally or alternatively, one or more flanges 14 may be a middle flange 14 positioned within a middle 50% of height 32 of elongate body portion 12 relative to base portion 16. Additionally or alternatively, one or more flanges 14 may be a lower flange 14 positioned within a lower 50% of height 32 of elongate body portion 12 relative to base portion 16. In some examples, the distance between horizontal portion 22 of each flange 14 and aperture 18 may be determined by the RF design of antenna component 10. Additionally or alternatively, antenna component 10 may be configured such that each respective horizontal portion 22 of each respective flange 14 may be sufficiently spaced away from aperture 18 to substantially prevent interference with performance of antenna component 10.

While two flanges 14 are schematically represented in FIG. 1, antenna components 10 according to the present disclosure may include fewer or more flanges 14. Generally, the number of flanges 14 that will be included in a given antenna component 10 may depend on the size of antenna component 10 and the interface requirements of antenna component 10, though antenna component 10 may include at least one flange 14 for each interface to a mating part (e.g., brackets) that the particular antenna component 10 is intended to mate with.

One or more flanges 14 may be configured to serve as a mount. For example, one or more flanges 14 may be used to mount a thermal blanket (e.g., a multi-layer insulation (MLI) thermal blanket) to antenna component 10. MLI thermal blankets may be formed of multiple layers of thin sheets and may be used to reduce heat loss by thermal radiation. In some examples including two or more flanges 14, the flange 14 closest to aperture 18 may be used to mount an MLI thermal blanket. Additionally or alternatively, one or more flanges 14 may be used to mount antenna component 10 to an antenna, a satellite, and/or another antenna component. Additionally or alternatively, base portion 16 may be configured to mount antenna component 10 to an RF attachment or other part. In a specific non-limiting example, a respective flange 14 in an upper position (e.g., closer to aperture 18) may be used to mount a thermal blanket to antenna component 10, while a respective flange 14 in a lower position (e.g., further from aperture 18) may be used to mount an RF attachment or other part (e.g., may couple antenna component 10 to an antenna or satellite). Generally, horizontal portion 22 of each flange 14 is used for the respective mounting, while angled portion 20 may be functional to enable additive manufacturing of flange 14 without the use of secondary support structures, as disclosed herein. Horizontal portion 22 of each flange 14 may include one or more through-holes and/or other features that facilitate said mounting.

Antenna components 10 may include one or more internal structures 54 configured to facilitate transmission and/or reception of radio frequency electromagnetic waves. In some examples, one or more internal structures 54 may be configured for a selected polarization, resonant frequency band, radiation pattern, and/or any functional antenna properties. Internal structure(s) 54 may include, for example, a septum, an iris, a dipole, a tuning screw, a post filter, and/or any combination thereof. When present, one or more internal structures 54 may be positioned on, coupled to, or formed on, for example, interior surface 34 of elongate body portion 12, outer surface 56 of elongate body portion 12, base portion 16, one or more flanges 14, or other feature of disclosed antenna components 10.

In general, antenna components 10 may be additively manufactured using a conductive raw material. For example, base portion 16 and elongate body portion 12 may be formed of a laser sintered metal alloy, such as a laser sintered aluminum alloy. Other examples of suitable materials may include copper, titanium, and/or alloys or combinations thereof. Antenna components 10 may be formed of multiple materials, or may be produced from a single material. Properties such as conductivity, elasticity, density, and/or temperature sensitivity, may be considered when selecting one or more materials for additively manufacturing antenna components 10. In some examples, appropriate or desirable materials may depend on an intended application of antenna component 10, and/or on the selected additive manufacturing method used to form antenna component 10.

As is well understood in the art, additively manufacturing antenna component 10 generally involves depositing a plurality of layers of material one at a time, with each layer being at least substantially perpendicular to longitudinal axis 24. Each layer may be relatively thin and fused to, or otherwise made to be cohesive with, adjacent layers above and below. Variation from one layer to an adjacent layer may be limited such that dimensions of antenna component 10 may change gradually along longitudinal axis 24. Antenna component 10 may be designed and manufactured such that it includes no abrupt overhangs (e.g., without any downward-facing surface forming an angle of greater than approximately 45 degrees with longitudinal axis 24). All features of antenna component 10 may therefore be additively manufactured without need for secondary supports. Suitable additive manufacturing techniques that may be used to manufacture disclosed antenna components 10 include, but are not limited to, direct metal laser sintering, selective laser melting, selective laser sintering, fused deposition modeling, and electron beam melting.

In some examples, base portion 16 and/or other portions of antenna component 10 may be configured for connection to an electronic circuit. For example, antenna component 10 may include one or more apertures configured for attaching one or more coaxial adaptors. Additionally or alternatively, antenna component 10 may be configured for connection to one or more other antenna components, such as a reflector dish or dipole. In some examples, antenna component 10 may be designed to have an equivalent functionality as an existing antenna design and may be configured to be retrofit into existing satellite systems to replace conventionally manufactured antenna components.

FIG. 3 schematically represents a satellite system 40 that includes disclosed additively manufactured antenna component 10. One or more other components of satellite system 40 also may be additively manufactured as well. Satellite system 40 may include an antenna body 42 having an external wall structure 44 at least partially forming an enclosed compartment 46. Antenna component 10 may be coupled to antenna body 42 and is configured to receive and transmit data while in space. A multi-layer insulation thermal blanket 48 may be coupled to a flange 14 of antenna component 10. Satellite systems 40 also may include a separation device 50 coupled to external wall structure 44, with separation device 50 being configured to mount and carry antenna body 42 (and antenna component 10) inside a launch vehicle during a launch phase and subsequently release antenna body 42 (and antenna component 10) from the launch vehicle after the launch phase. Once launched, antenna component 10 may be used as part of satellite system 40 (or other antenna system) to transmit and/or receive RF signals.

Turning now to FIGS. 4-7, illustrative non-exclusive examples of antenna components 10 are illustrated. Where appropriate, the reference numerals from the schematic illustrations of FIGS. 1-3 are used to designate corresponding parts of FIGS. 4-7; however, the examples of FIGS. 4-7 are non-exclusive and do not limit antenna components 10 to the illustrated examples of FIGS. 4-7. That is, antenna components 10 are not limited to the specific examples of the illustrated FIGS. 4-7 and may incorporate any number of the various aspects, configurations, characteristics, properties, etc. of antenna components 10 that are illustrated in and discussed with reference to the schematic representations of FIGS. 1-3 and/or the examples of FIGS. 4-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 4-7; however, it is within the scope of the present disclosure that the previously discussed features, variants, etc. may be utilized therewith.

Figure 4:
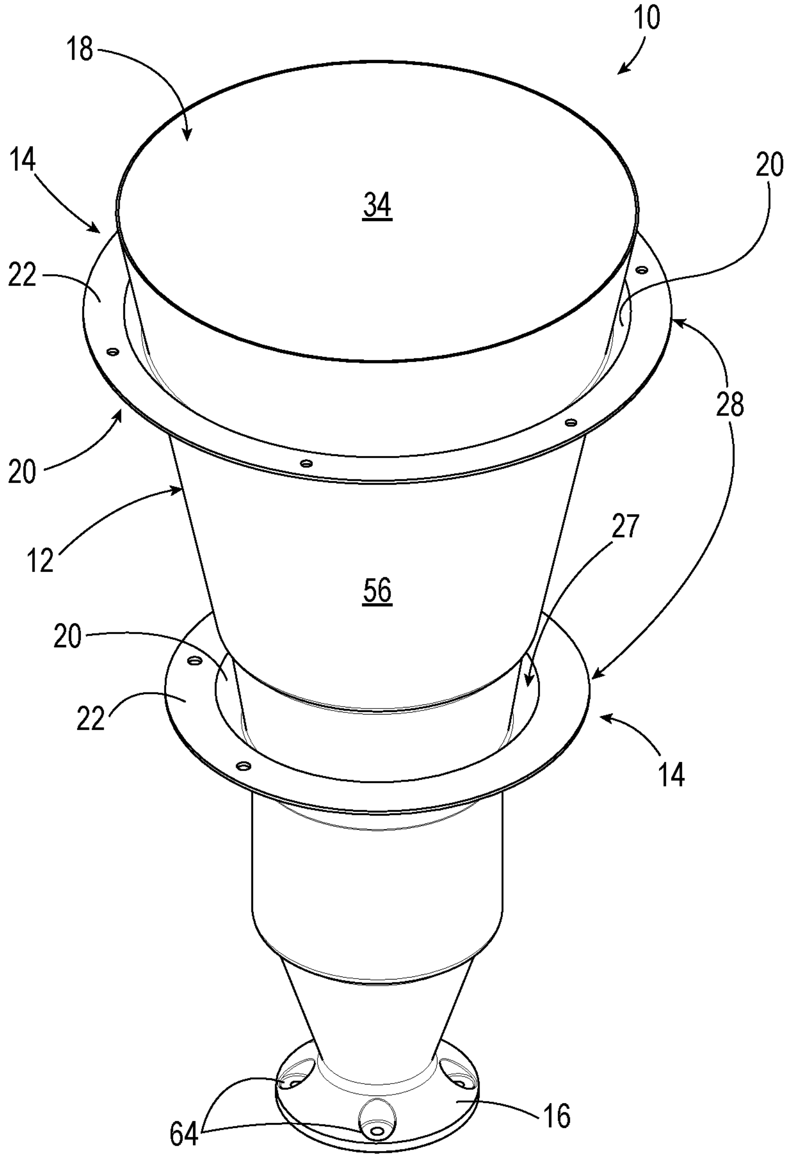
FIG. 4 is a perspective view of an example of an antenna component according to the present disclosure.
Figure 5:
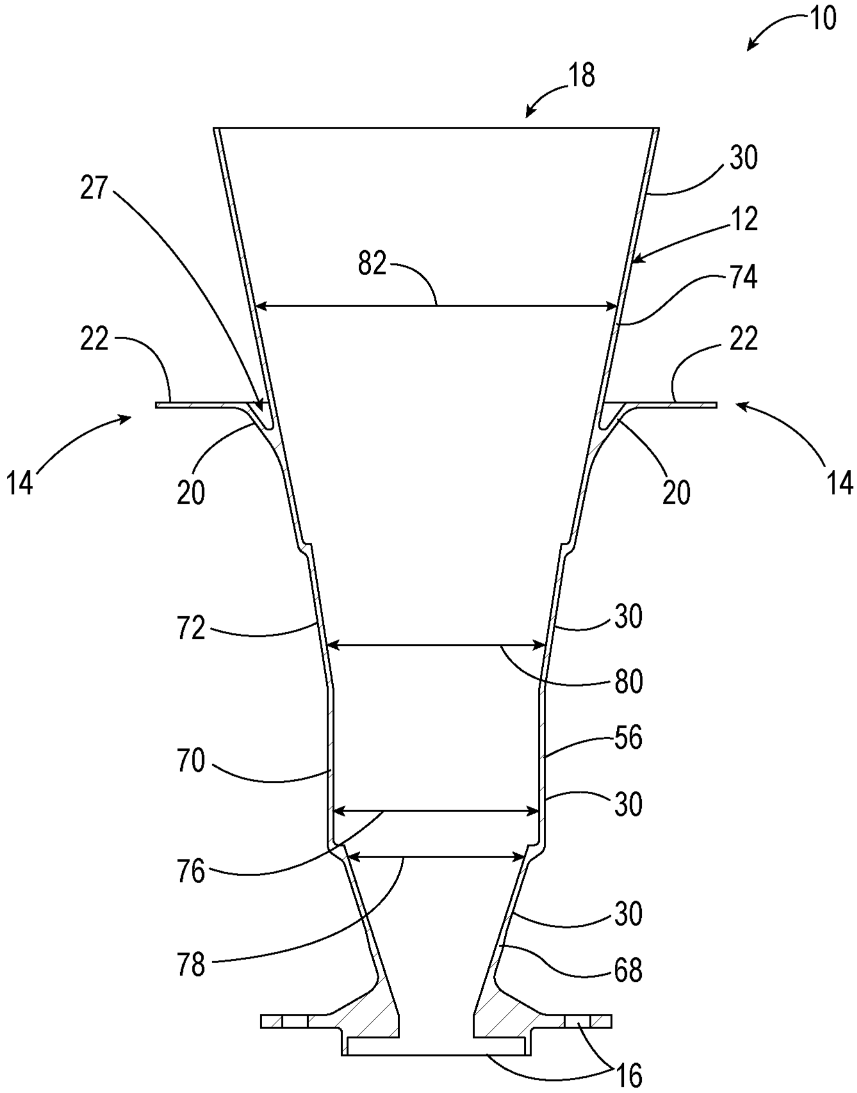
FIG. 5 is a side cross-sectional view of an example of an antenna component according to the present disclosure.
Figure 6:
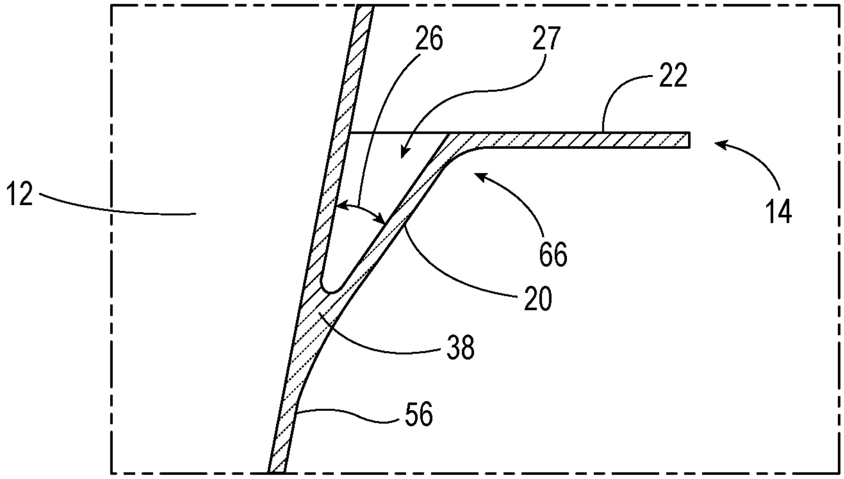
FIG. 6 is a close-up side elevation cutaway view of a portion of an example of an antenna component according to the present disclosure.

FIG. 4 shows a perspective view of an example of antenna component 10 in the form of an X-band antenna horn, while FIG. 5 shows a side elevation view of an example of antenna component 10 in the form of a Ka-band antenna horn. The example shown in FIG. 4 includes two flanges 14, while the example of FIG. 5 has just one flange 14. As described above, but best visible in FIGS. 4-5, angled portion 20 of each flange diverges from elongate body portion 12 to form a respective recess 27 between each respective angled portion 20 and elongate body portion 12. Thereby, each respective horizontal portion 22 of each flange 14 is spaced apart from elongate body portion 12. FIG. 6 shows up a close-up side elevation cutaway view of a portion of the antenna component shown in FIG. 4 with a view of recess 27 formed by angled portion 20 diverging from elongate body portion 12 at angle 26. Respective angles 26 of different respective flanges 14 within a given antenna component 10 may be substantially uniform, or one or more flanges 14 may diverge from elongate body portion 12 at a different angle 26 from one or more other flanges 14 of the given antenna component 10. As best seen in FIG. 6, the transitions from elongate body portion 12 to angled portion 20 to horizontal portion 22 may be gradual, continuous, and/or curved, rather than creating any sharp or sudden changes. For example, the transition from angled portion 20 to horizontal portion 22 may include a slight radius of curvature 66 in some examples.

FIGS. 4-5 illustrate elongate body portions 12 having different shaped sections of body perimeter 30. For example, with reference to FIG. 5, elongate body portion 12 may have a first conical section 68 extending from base portion 16 towards aperture 18, a substantially cylindrical section 70 extending from first conical section 68 towards aperture 18, a second conical section 72 extending from substantially cylindrical section 70 towards aperture 18, and a third conical section 74 extending from second conical section 72 to or towards aperture 18. In other examples of antenna component 10, elongate body portion 12 may include more or fewer sections, and/or may include differently shaped sections and/or sections in different orders than shown in the example of FIG. 5. In the example of FIG. 5, substantially cylindrical section 70 may have a first outer diameter 76 that is substantially the same as or slightly larger than a maximum second outer diameter 78 of first conical section 68. In some examples, second outer diameter 78 of first conical section 68 increases between base portion 16 and substantially cylindrical section 70. Similarly, a third outer diameter 80 of second conical section 72 may increase between substantially cylindrical section 70 and third conical section 74, and a fourth outer diameter 82 of third conical section 74 may increase between second conical section 72 and aperture 18.

Figure 7:
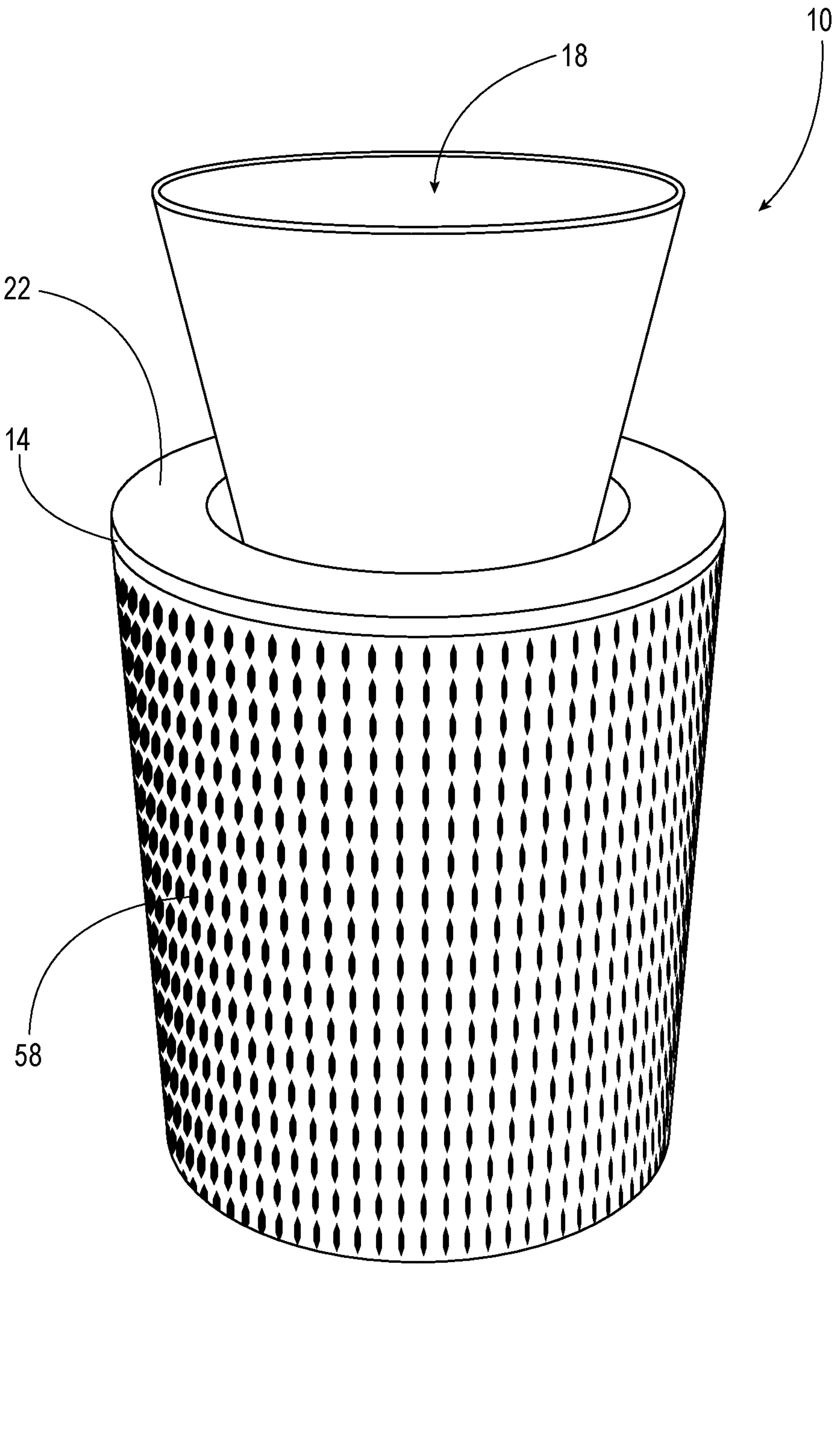
FIG. 7 is a perspective view of an example of presently disclosed antenna components, having a lattice strengthening structure attached thereto.

As shown in FIG. 7, disclosed antenna components 10 may include a lattice stiffening structure 58 adjacent outer surface 56 of elongate body portion 12. Said lattice stiffening structure 58 may be configured to stiffen and/or support elongate body portion 12 and/or may be configured to avoid secondary printing support requirements. Lattice stiffening structures 58 may be positioned to surround a portion of elongate body portion 12, and may be adjacent and/or coupled to one or more flanges 14. For example, lattice stiffening structure 58 may engage with horizontal portion 22 and/or angled portion 20 of one or more flanges 14.

Figure 8:
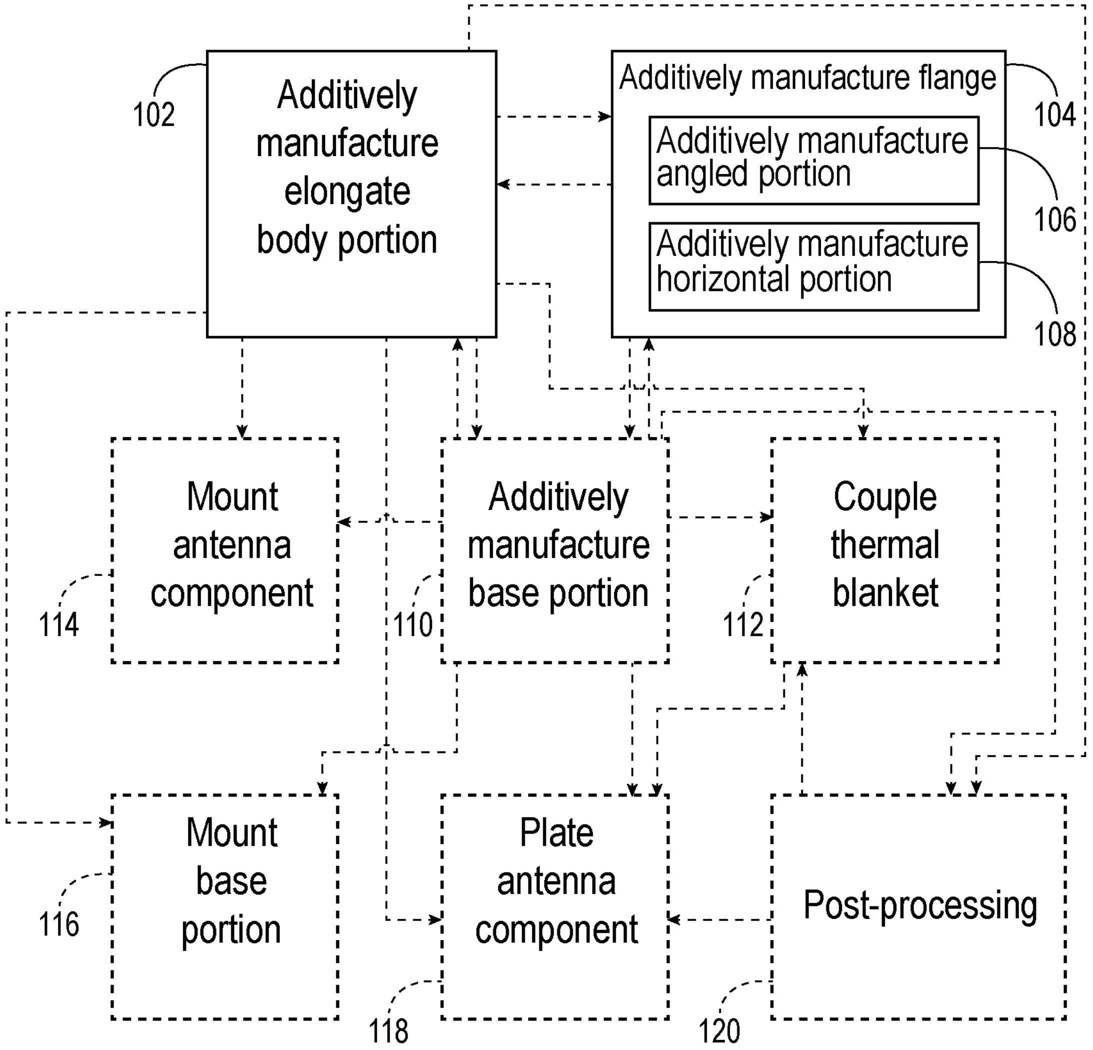
FIG. 8 is a schematic flowchart diagram representing examples of methods of additively manufacturing antenna components according to the present disclosure.

FIG. 8 schematically provides a flowchart that represents illustrative, non-exclusive examples of methods 100 according to the present disclosure. In FIG. 8, some steps are illustrated in dashed boxes indicating that such steps may be optional or may correspond to an optional version of a method according to the present disclosure. That said, not all methods 100 according to the present disclosure are required to include the steps illustrated in solid boxes. The methods 100 and steps illustrated in FIG. 8 are not limiting and other methods and steps are within the scope of the present disclosure, including methods having greater than or fewer than the number of steps illustrated, as understood from the discussions herein.

FIG. 8 illustrates methods 100 of additively manufacturing an antenna component (e.g., antenna component 10). Methods 100 generally include additively manufacturing an elongate body portion (e.g., elongate body portion 12), at 102, and additively manufacturing at least one flange (e.g., flange 14) at 104. Additively manufacturing the elongate body portion at 102 generally includes additively manufacturing a substantially hollow elongate body portion that extends up from a base portion (e.g., base portion 16) to an aperture opposite the base portion (e.g., aperture 18), such that the elongate body portion is configured to direct radio frequency signals. Additively manufacturing the at least one flange at 104 generally includes additively manufacturing a flange that extends radially outward from the elongate body portion, and in some examples, annularly around an outer circumference of the elongate body portion. As described herein, one or more flanges are integrally formed with the elongate body portion. For example, additively manufacturing the at least one flange at 104 may be performed by laser sintering a metal alloy, such as an aluminum alloy. Additively manufacturing the at least one flange at 104 generally includes additively manufacturing an angled portion of the flange (e.g., angled portion 20), at 106, and additively manufacturing a horizontal portion of the flange (e.g., horizontal portion 22), at 108.

Methods 100 also may include additively manufacturing a base portion (e.g., base portion 16), at 110. In some methods 100, additively manufacturing the base portion at 110 may be performed before additively manufacturing the at least one flange at 104, such that the antenna component is built from the bottom up (e.g., from the base portion towards the aperture). In other examples of methods 100, additively manufacturing the base portion at 110 may be performed after additively manufacturing the at least one flange at 104, such that the antenna component is built from the top down (e.g., from the aperture towards the base portion), although building in this direction may be aided with secondary support structures. Additively manufacturing the elongate body portion at 102, additively manufacturing the at least one flange at 104, and/or additively manufacturing the base portion at 110 may be performed without the use of any secondary support structures.

Methods 100 may include mounting the antenna component to an antenna and/or to another antenna component, via one or more flanges, at 114. Additionally or alternatively, methods 100 may include mounting the base portion to an RF attachment or other part, at 116. Additionally or alternatively, methods 100 may include coupling a multi-layer insulation thermal blanket to one or more flanges of the antenna component, at 112.

In methods 100, the steps involving additively manufacturing features of the antenna component (e.g., steps 102, 104, and/or 110) generally include creating and/or receiving digital information describing the order, size, and shape of a plurality of layers to be deposited to form the antenna component. The digital information may be received by a computer controller of an additive manufacturing device, which may also be referred to as a printer, or a fabricator. The computer controller may comprise any data processing system configured to receive digital design information and control functions of the printer or other additive manufacturing device. The digital information may include geometric data and/or design details for a plurality of two-dimensional patterns that constitute layers of a three-dimensional antenna component. In various examples of methods 100, the antenna component may be a command horn antenna or a cup dipole antenna.

In additively manufacturing features of the antenna component (e.g., steps 102, 104, and/or 110), the raw material may be any material suitable for additive manufacturing and use in antenna components, typically a fluid or powder and including but not limited to photopolymer resin, thermoplastic, plaster, ceramic, and metals. Aluminum alloy powders may be especially suited for disclosed antenna components, though the flanges and processes disclosed herein may be formed of different materials and/or for different industries (e.g., for applications other than antenna components). The raw material may be distributed from a raw material source such as a hopper, a tank, or a powder bed. For example, an aluminum alloy powder may be swept from a powder bed onto a build platform by a computer-controlled actuator, with the powder being distributed evenly over the build platform or deposited in a selected pattern. In some examples, additively manufacturing features of the antenna component (e.g., steps 102, 104, and/or 110) may include depositing the raw material in a pattern corresponding to the first layer of the ordered plurality of layers, via a print head connected to a raw material source. The first layer of the raw material may then be cured, fused, melted, sintered etc., such as by exposure to heat, light, electrons, and/or a laser beam. The build platform may then be repositioned and a subsequent layer may then be deposited and fused to the previous layer of fused material. These steps may be repeated any desired number of times to complete additively manufacturing features of the antenna component (e.g., steps 102, 104, and/or 110).

Because disclosed antenna components are generally singular monolithic structures, additively manufacturing features of the antenna component at 102, 104, and/or 110 may not necessarily be performed sequentially, but rather, may be performed substantially simultaneously at times, and/or some method steps 102, 104, and/or 110 may be performed before and/or after other of method steps 102, 104, and/or 110. For example, in examples where the antenna component is additively manufactured from the base portion up, the base portion may be additively manufactured at 110, then the elongate body portion may begin to be additively manufactured at 102. Then, once the elongate body portion has been built up to the desired height for placement of a flange, a flange may be additively manufactured at 104 while the elongate body portion continues to be additively manufactured at 102. Meanwhile, once the flange is completed at 104, the elongate body portion may be continued to be additively manufactured at 102. In some methods of course, one or more additional flanges may later be additively manufactured at 104 as the antenna component continues to be built up at 102.

Methods 100 may further include plating the antenna component with nickel, copper, and/or silver, at 118, which may be performed to enhance antenna performance. Additionally or alternatively, while disclosed antenna components may be configured to be additively manufactured in methods 100 without the use of secondary supports and without post-processing, some methods 100 may include limited post-processing at 120, such as machining detailed features or limited surface finishing.

Illustrative, non-exclusive examples of inventive subject matter according to the present disclosure are described in the following enumerated paragraphs:

A1. An antenna component (10), comprising:

an additively manufactured elongate body portion (12) extending from a base portion (16) to an aperture (18) opposite the base portion (16), wherein the elongate body portion (12) is at least substantially hollow, and wherein the elongate body portion (12) is configured to direct radio frequency signals; and an additively manufactured first flange (14) extending radially outwardly from the elongate body portion (12) and around an outer circumference (30) of the elongate body portion (12), wherein the first flange (14) is integrally formed with the elongate body portion (12), wherein the first flange (14) comprises an angled portion (20) that diverges from the elongate body portion (12) at a first angle (26), wherein the first flange (14) further comprises a horizontal portion (22) that is at least substantially perpendicular to a longitudinal axis (24) of the elongate body portion (12), and wherein the first angle (26) is acute.

A1.1. The antenna component (10) of paragraph A1, wherein the antenna component (10) comprises an antenna horn.

A1.2. The antenna component (10) of paragraph A1 or A1.1, wherein the base portion (16) comprises an additively manufactured base portion.

A1.3. The antenna component (10) of any of paragraphs A1-A1.2, wherein the horizontal portion (22) of the first flange (14) is separated from the aperture (18) by a first distance, wherein the first distance is sufficiently large to prevent interference with performance of the antenna component (10).

A1.4. The antenna component (10) of any of paragraphs A1-A1.3, wherein the first flange (14) is annular.

A2. The antenna component (10) of any of paragraphs A1-A1.4, wherein the base portion (16) is integrally formed with the elongate body portion (12), such that the antenna component (10) comprises a singular additively manufactured monolithic structure.

A3. The antenna component (10) of any of paragraphs A1-A2, further comprising an additively manufactured second flange (14') extending radially outwardly from the elongate body portion (12) and around the outer circumference (30) of the elongate body portion (12), wherein the second flange (14') is integrally formed with the elongate body portion (12), wherein the second flange (14') comprises a second angled portion (20') that diverges from the elongate body portion (12) at a second angle (26'), wherein the second flange (14') further comprises a second horizontal portion (22') that is at least substantially perpendicular to the longitudinal axis (24) of the elongate body portion (12), and wherein the second angle (26') is acute.

A3.1. The antenna component (10) of paragraph A3, wherein the second horizontal portion (22') of the second flange (14') is separated from the aperture (18) by a second distance, wherein the second distance is sufficiently large to prevent interference with performance of the antenna component (10).

A3.2. The antenna component (10) of any of paragraphs A3-A3.1, wherein the second flange (14') is annular.

A4. The antenna component (10) of any of paragraphs A3-A3.2, wherein the second angle (26') is substantially the same as the first angle (26).

A5. The antenna component (10) of any of paragraphs A3-A3.2, wherein the second angle (26') is different from the first angle (26).

A6. The antenna component (10) of any of paragraphs A1-A5, wherein the first flange (14) comprises an upper flange positioned with an upper 50% of a height (32) of the elongate body portion (12) relative to the base portion (16).

A7. The antenna component (10) of any of paragraphs A1-A6, wherein a/the second flange (14') comprises a middle flange positioned within a middle 50% of a/the height (32) of the elongate body portion (12) relative to the base portion (16).

A8. The antenna component (10) of any of paragraphs A1-A7, wherein the first flange (14) and/or a/the second flange (14') is configured to be used to mount a thermal blanket (48) to the antenna component.

A9. The antenna component (10) of any of paragraphs A1-A8, wherein the first flange (14) and/or a/the second flange (14') is configured to be used to mount the antenna component (10) to an antenna and/or another antenna component.

A10. The antenna component (10) of any of paragraphs A1-A9, wherein the base portion (16) is configured to mount the antenna component (10) to an RF attachment or other part.

A11. The antenna component (10) of any of paragraphs A1-A10, wherein the first angle (26) and/or a/the second angle (26') is greater than 30 degrees.

A12. The antenna component (10) of any of paragraphs A1-A11, wherein the first angle (26) and/or a/the second angle (26') is 60 degrees or less.

A13. The antenna component (10) of any of paragraphs A1-A12, wherein the first angle (26) and/or a/the second angle (26') is selected such that the antenna component (10) is configured to be additively manufactured as a single unitary body without use of a support structure.

A14. The antenna component (10) of any of paragraphs A1-A13, wherein the base portion (16) and the elongate body portion (12) are formed of a laser sintered metal alloy.

A15. The antenna component (10) of any of paragraphs A1-A14, wherein the base portion (16) and the elongate body portion (12) are formed of a laser sintered aluminum alloy.

A16. The antenna component (10) of any of paragraphs A1-A15, wherein the base portion (16) comprises a circular base portion that extends radially outward from the elongate body portion (12).

A17. The antenna component (10) of any of paragraphs A1-A16, wherein the elongate body portion (12) is configured to direct radio frequency signals within the X-band.

A18. The antenna component (10) of any of paragraphs A1-A17, wherein the elongate body portion (12) is configured to direct radio frequency signals within the Ka-band, Ku band, C band, UHF band, S band, and/or L band.

A19. The antenna component (10) of any of paragraphs A1-A18, wherein the first flange (14) and/or a/the second flange (14') is configured to substantially prevent deformation of an interior surface (34) of the elongate body portion (12) during additive manufacturing of the antenna component (10).

A20. The antenna component (10) of any of paragraphs A1-A19, wherein the elongate body portion (12) comprises a first conical section (68) extending from the base portion (16), a substantially cylindrical section (70) extending from the first conical section (68), a second conical section (72)

extending from the substantially cylindrical section (70), and a third conical section (74) extending from the second conical section (72).

A21. The antenna component (10) of paragraph A20, wherein a first outer diameter (76) of the first conical section (68) increases between the base portion (16) and the substantially cylindrical section (70), wherein a second outer diameter (78) of the second conical section (72) increases between the substantially cylindrical section (70) and the third conical section (74), and wherein a third outer diameter (80) of the third conical section (74) increases between the second conical section (72) and the aperture (18).

A21.1. The antenna component (10) of any of paragraphs A1-A21, wherein the elongate body portion (12) comprises a conical or square portion.

A22. The antenna component (10) of any of paragraphs A1-A21.1, wherein the elongate body portion (12) has a wall thickness (36) of at least 0.15 millimeters (mm), at least 0.20 mm, at least 0.25 mm, at least 0.30 mm, at least 0.35 mm, at least 0.40 mm, at least 0.50 mm, and/or at most 1 mm.

A23. The antenna component (10) of any of paragraphs A1-A22, wherein the horizontal portion (22) of the first flange (14) is positioned closer to the aperture (18) than an origination point (38) of the angled portion (20) of the first flange (14).

A24. The antenna component (10) of any of paragraphs A1-A23, wherein the horizontal portion (22) of the first flange (14) is continuous with the angled portion (20) of the first flange (14).

B1. A satellite system (40), comprising:
- a body (42) having an external wall structure (44) at least partially forming an enclosed compartment (46);
- the antenna component (10) of paragraphs A1-A24, wherein the antenna component (10) is coupled to the body (42), and wherein the antenna component (10) is configured to receive and transmit data while in space; and
- a multi-layer insulation thermal blanket (48) coupled to the first flange (14) of the antenna component (10).

B2. The satellite system (40) of paragraph B1, further comprising a separation device (50) connected to the external wall structure (44), wherein the separation device (50) is configured to mount and carry the body (42) inside a launch vehicle during a launch phase, and subsequently release the body (42) from the launch vehicle after the launch phase.

C1. A method (100) of additively manufacturing an antenna component (10), the method comprising:
- additively manufacturing (102) an elongate body portion (12), wherein the elongate body portion (12) extends up from a base portion (16) to an aperture (18) opposite the base portion (16), wherein the elongate body portion (12) is at least substantially hollow, and wherein the elongate body portion (12) is configured to direct radio frequency signals; and
- additively manufacturing (104) a first flange (14) that extends radially outwardly from the elongate body portion (12) and around an outer circumference (30) of the elongate body portion (12), wherein the first flange (14) is integrally formed with the elongate body portion (12), wherein the additively manufacturing (104) the first flange (14) comprises:
  - additively manufacturing (106) an angled portion (20) of the first flange (14), wherein the angled portion (20) diverges from the elongate body portion (12) at a first angle (26), wherein the first angle (26) is acute; and
  - additively manufacturing (108) a horizontal portion (22) of the first flange (14), wherein the horizontal portion (22) is at least substantially perpendicular to a longitudinal axis (24) of the elongate body portion (12).

C1.1. The method (100) of paragraph C1, further comprising additively manufacturing (110) the base portion (16).

C2. The method (100) of paragraph C1 or C1.1, wherein the antenna component (10) comprises the antenna component (10) of any of paragraphs A1-A24.

C3. The method (100) of any of paragraphs C1-C2, wherein the antenna component (10) has an intended operating frequency with the X-band or Ka-band.

C4. The method (100) of any of paragraphs C1-C3, further comprising coupling (112) a multi-layer insulation thermal blanket (48) to the first flange (14) and/or a/the second flange (14') of the antenna component (10).

C5. The method (100) of any of paragraphs C1-C4, comprising additively manufacturing (110) the base portion (16) of the antenna component (10) without the use of a support structure.

C6. The method (100) of any of paragraphs C1-C5, wherein the additively manufacturing (102) the elongate body portion (12) is performed without the use of a/the support structure.

C7. The method (100) of any of paragraphs C1-C6, wherein the additively manufacturing (104) the first flange (14) is performed without the use of a/the support structure.

C8. The method (100) of any of paragraphs C1-C7, comprising additively manufacturing (110) the base portion (16) before the additively manufacturing (104) the first flange (14).

C9. The method (100) of any of paragraphs C1-C7, comprising additively manufacturing (110) the base portion (16) after the additively manufacturing (104) the first flange (14).

C10. The method (100) of any of paragraphs C1-C9, further comprising additively manufacturing (104) a/the second flange (14') that extends radially outwardly from the elongate body portion (12) and around the outer circumference (30) of the elongate body portion (12), wherein the second flange (14') is integrally formed with the elongate body portion (12), wherein the additively manufacturing (104) the second flange (14') comprises:
- additively manufacturing (106) a second angled portion (20') of the second flange (14'), wherein the second angled portion (20') diverges from the elongate body portion (12) at a second angle (26'), wherein the second angle (26') is acute; and additively manufacturing (108) a second horizontal portion (22') of the second flange (14'), wherein the second horizontal portion (22') is at least substantially perpendicular to the longitudinal axis (24) of the elongate body portion (12).

C11. The method (100) of any of paragraphs C1-C10, further comprising mounting (114) the antenna component (10) to an antenna and/or another antenna component, via the first flange (14) and/or a/the second flange (14').

C12. The method (100) of any of paragraphs C1-C11, further comprising mounting (116) the base portion (16) to an/the RF attachment or other part.

C13. The method (100) of any of paragraphs C1-C12, wherein the additively manufacturing (102) the elongate body portion (12) and the additively manufacturing (104) the first flange (14) comprise laser sintering a metal alloy.

C14. The method (100) of any of paragraphs C1-C13, wherein the additively manufacturing (102) the elongate body portion (12) and the additively manufacturing (104) the first flange (14) comprise laser sintering an aluminum alloy.

C15. The method (100) of any of paragraphs C1-C13, further comprising plating (118) the antenna component (10) with nickel, copper, and/or silver, to enhance antenna performance.

D1. The use of the antenna component (10) of any of paragraphs A1-A24 in a satellite.

D2. The use of the antenna component (10) of any of paragraphs A1-A24 and/or the satellite system (40) of any of paragraphs B1-132 to direct radio frequency signals.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. An antenna component, comprising:

an additively manufactured elongate body portion extending from a base portion to an aperture opposite the base portion, wherein the elongate body portion is at least substantially hollow, and wherein the elongate body portion is configured to direct radio frequency signals; and an additively manufactured first flange extending radially outwardly from the elongate body portion and around an outer circumference of the elongate body portion, wherein the first flange is integrally formed with the elongate body portion, wherein the first flange comprises an angled portion that diverges from the elongate body portion at a first angle, wherein the first flange further comprises a horizontal portion that is at least substantially perpendicular to a longitudinal axis of the elongate body portion, and wherein the first angle is acute.

2. The antenna component according to claim 1, wherein the base portion is integrally formed with the elongate body portion, such that the antenna component comprises a singular additively manufactured monolithic structure.

3. The antenna component according to claim 1, further comprising an additively manufactured second flange extending radially outwardly from the elongate body portion and around the outer circumference of the elongate body portion, wherein the second flange is integrally formed with the elongate body portion, wherein the second flange comprises a second angled portion that diverges from the elongate body portion at a second angle, wherein the second flange further comprises a second horizontal portion that is at least substantially perpendicular to the longitudinal axis of the elongate body portion, and wherein the second angle is acute.

4. The antenna component according to claim 3, wherein the first flange is configured to be used to mount a thermal blanket to the antenna component.

5. The antenna component according to claim 3, wherein the second flange is configured to be used to mount the antenna component to another antenna component.

6. The antenna component according to claim 3, wherein the first angle and the second angle is each greater than 30 degrees and less than 60 degrees.

7. The antenna component according to claim 3, wherein the first angle and the second angle are selected such that the antenna component is configured to be additively manufactured as a single unitary body without use of a support structure.

8. The antenna component according to claim 1, wherein the base portion and the elongate body portion are formed of a laser sintered aluminum alloy.

9. The antenna component according to claim 1, wherein the elongate body portion is configured to direct radio frequency signals within the X-band.

10. The antenna component according to claim 1, wherein the elongate body portion is configured to direct radio frequency signals within the Ka-band.

11. The antenna component according to claim 1, wherein the first flange is configured to substantially prevent deformation of an interior surface of the elongate body portion during additive manufacturing of the antenna component.

12. The antenna component according to claim 1, wherein the elongate body portion has a wall thickness of at least 0.15 millimeters (mm), at least 0.20 mm, at least 0.25 mm, at least 0.30 mm, at least 0.35 mm, at least 0.40 mm, at least 0.50 mm, and/or at most 1 mm.

13. The antenna component according to claim 1, wherein the horizontal portion of the first flange is positioned closer to the aperture than an origination point of the angled portion of the first flange.

14. The antenna component according to claim 1, wherein the horizontal portion of the first flange is continuous with the angled portion of the first flange.

15. A satellite system, comprising:

a body having an external wall structure at least partially forming an enclosed compartment;

the antenna component according to claim 1, wherein the antenna component is coupled to the body, and wherein the antenna component is configured to receive and transmit data while in space; and a multi-layer insulation thermal blanket coupled to the first flange of the antenna component.

16. A method of additively manufacturing an antenna component, the method comprising:

additively manufacturing an elongate body portion, wherein the elongate body portion extends up from a base portion to an aperture opposite the base portion, wherein the elongate body portion is at least substantially hollow, and wherein the elongate body portion is configured to direct radio frequency signals; and additively manufacturing a first flange that extends radially outwardly from the elongate body portion and around an outer circumference of the elongate body portion, wherein the first flange is integrally formed with the elongate body portion, wherein the additively manufacturing the first flange comprises:

additively manufacturing an angled portion of the first flange, wherein the angled portion diverges from the elongate body portion at a first angle, wherein the first angle is acute; and additively manufacturing a horizontal portion of the first flange, wherein the horizontal portion is at least substantially perpendicular to a longitudinal axis of the elongate body portion.

17. The method according to claim 16, wherein the additively manufacturing the elongate body portion is performed without the use of a support structure, and wherein the additively manufacturing the first flange is performed without the use of a support structure.

18. The method according to claim 16, further comprising additively manufacturing a second flange that extends radially outwardly from the elongate body portion and around the outer circumference of the elongate body portion, wherein the second flange is integrally formed with the elongate body portion, wherein the additively manufacturing the second flange comprises:

additively manufacturing a second angled portion of the second flange, wherein the second angled portion diverges from the elongate body portion at a second angle, wherein the second angle is acute; and additively manufacturing a second horizontal portion of the second flange, wherein the second horizontal portion is at least substantially perpendicular to the longitudinal axis of the elongate body portion.

19. The method according to claim 16, wherein the additively manufacturing the elongate body portion and the additively manufacturing the first flange comprise laser sintering an aluminum alloy.

20. The method according to claim 16, further comprising plating the antenna component with one or more selected from the group comprising nickel, copper, and silver, to enhance antenna performance.

* * * * *